United States Patent [19]

Burgess

[11] Patent Number: 4,609,385
[45] Date of Patent: Sep. 2, 1986

[54] MULTI STAGE WATER DEOXYGENATOR

[75] Inventor: Harry L. Burgess, Houston, Tex.

[73] Assignee: Burgess & Associates Mfg., Inc., Houston, Tex.

[21] Appl. No.: 731,071

[22] Filed: May 6, 1985

[51] Int. Cl.⁴ .............................................. B01D 19/00
[52] U.S. Cl. ......................................... 55/193; 55/38; 55/55
[58] Field of Search ..................... 55/38, 55, 165, 178, 55/189, 191, 193

[56] References Cited

U.S. PATENT DOCUMENTS

| | | | |
|---|---|---|---|
| 3,296,776 | 1/1976 | Youngman | 55/165 |
| 4,084,946 | 4/1978 | Burgess | 55/189 X |
| 4,451,270 | 5/1984 | Roman | 55/38 |

FOREIGN PATENT DOCUMENTS 2132502  7/1984  United Kingdom ..................... 55/55

OTHER PUBLICATIONS

Miller, International Application WO83/02402, 7-83.

Primary Examiner—Charles Hart
Attorney, Agent, or Firm—Carl G. Ries

[57] ABSTRACT

A plural stage subatmospheric water deoxygenator of the type wherein oxygen-containing water charged through a water feedline is sprayed into a vacuum chamber for the removal of oxygen therefrom which also includes first stage vacuum chamber means including first stage scheduling means for simultaneously and continuously:

1. Spraying charged pressured feedwater into the first stage vacuum chamber to initiate the removal of oxygen therefrom and
2. Adjusting the rate of flow of feed water to and through the scheduling means in order to maintain a predetermined volume of partially deoxygenated water at a predetermined level in said first stage vacuum chamber to thereby fluidly seal the first stage vacuum chamber;

The first stage vacuum chamber means also including liquid-liquid conduit means interconnecting the partially deoxygenated water in the first stage with the vacuum chamber and means for maintaining a subatmospheric pressure differential so that partially deoxygenated water will flow from the first stage to the vacuum chamber.

9 Claims, 1 Drawing Figure

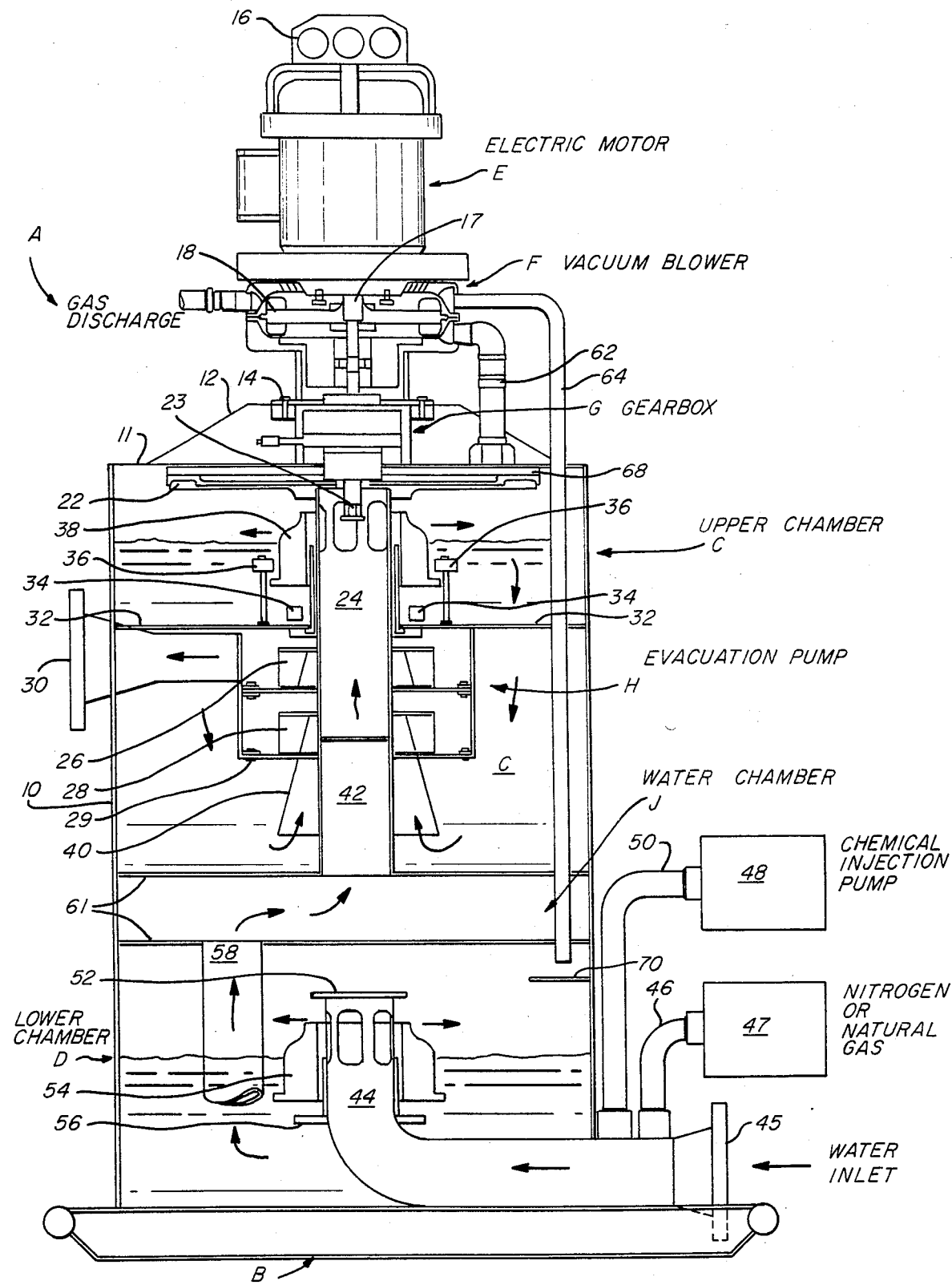

MULTI STAGE WATER DEOXYGENATOR

TECHNICAL FIELD OF THE INVENTION

This invention relates to a device for removing occluded gases such as oxygen from water. More particularly, this invention relates to a multi stage subatmospheric water degasser for removing, for example, substantially all of the occluded oxygen normally found in water such that the water is of a quality suitable for injection into a subterranean reservoir through a well for use in the secondary recovery of petroleum hydrocarbons.

DESCRIPTION OF THE PRIOR ART

It is known to treat water to be used for secondary recovery operations in order to remove substantially all of the occluded oxygen therefrom. In a typical situation, water is produced from a suitable source, such as a well penetrating a porous subterranean aquifer, and the thus-produced well water is treated for the removal of oxygen therefrom and the deoxygenated water is then reinjected through another well into a porous subterranean formation containing hydrocarbons in order recover an to enhanced amount of hydrocarbons as compared with the amount that would ordinarily be obtained without the secondary recovery water flooding operation. Typically, triplex or centrifugal pumps are used for the injection step in order to generate the pressure necessary for injection of the water into the subterranean formation. In order to prevent cavitation and wear on such pumps, it is conventional practice to supply water to the triplex or centrifugal pump under pressure. This is conveniently accomplished by providing a water tower for storing the deoxygenated water so that the water withdrawn from the water tower for injection will be under the desired head of pressure at the suction side of the triplex or centrifugal pump.

It has long been the practice to remove oxygen from water to be used in industrial applications such as boilers, condensers, and the like. This can be accomplished, for example, by using an inert gas such as nitrogen to displace the oxygen as shown, for example, in Kent U.S. Pat. No. 1,725,925; Kumamoto et al. U.S. Pat. No. 3,132,013; Bloem U.S. Pat. No. 4,017,276 and Notardonato et al. U.S. Pat. No. 4,352,679.

It is also known to utilize vacuum stripping for the removal of oxygen as shown, for example, by Rumpf et al. U.S. Pat. No. 3,856,483 and Tkach U.S. Pat. No. 4,201,555.

Tkach U.S. Pat. No. 4,201,555 provides excellent background information, pointing out that the removal of entrained gasses from a liquid can be accomplished by one of four general methods namely, counter flow scavenging, degasification by vacuum stripping, the Toricelli method or chemcal treatment.

It is also known to use a combination of inert gas stripping and vacuum stripping to facilitate the removal of occluded gases from water as shown, for example, by McGill U.S. Pat. No. 3,898,058 and Tkach U.S. Pat. No. 3,460,319. These methods suffer from the disadvantage that large holding tanks and laminar flow is required in order for successful gas removal.

It is also known to remove occluded gases from aqueous fluids that are to be injected into a well, such as a well that is being drilled through subterranean formations. It is necessary to use an aqueous drilling mud during the drilling operation. Numerous single stage devices are known for removing substantial quantities of air or other undesirable gases from drilling muds as shown, for example, by Philips et al. U.S. Pat. No. 4,088,457; Brown U.S. Pat. No. 4,113,452; Shifflet U.S. Pat. No. 4,272,258; Day et al. U.S. Pat. No. 4,326,863; Egbert U.S. Pat. No. 4,365,977 and Underwood U.S. Pat. No. 4,416,672.

Applicant has also designed single stage devices for degassing drilling mud as shown in Burgess U.S. Pat. No. 3,973,930, Burgess U.S. Pat. No. 3,999,965 and Burgess U.S. Pat. No. 4,084,946.

BACKGROUND OF THE INVENTION

The device of the present invention is an improvement over drilling mud degassers of the type wherein drilling mud is sprayed into a vacuum chamber to remove a substantial amount of the oxygen present in the drilling mud, such as a drilling mud degasser as shown and descrubed in Burgess U.S. Pat. No. 4,084,946.

When a device of the type disclosed in Burgess U.S. Pat. No. 4,084,946 is used for the deoxygenation of water to be used for a secondary recovery operation, the results are not entirely satisfactory in that single stage centrifugation and spray impacting of the water under vacuum will not remove substantially all of the oxygen normally present in water (typically about 10 to 12 parts per million) such that as much as 3 to 5 parts per million or more of oxygen will remain in the treated water. It is normally considered necessary to provide injection water containing less than about 1 part per million of water, and preferably about 0.01 parts per million of oxygen or less.

SUMMARY OF THE INVENTION

In accordance with the present invention the foregoing and related problems are overcome through the provision of a subatmospheric water deoxygenator of the type wherein there is provided a final stage and a first stage of vacuum deoxygenation;

the final stage comprising a vacuum chamber to which partially deoxygenated water is fed for final oxygen removal comprising means for accellerating and centrifuging partially deoxygenated water fed thereto, means for spraying the accellerated and centrifuged water into the vacuum chamber and means for discharging the deoxygenated water from the deoxygenator;

the first vacuum stage being operatively connected with the final stage and comprising scheduling means connected to a pressured feed water source for simultaneously and continuously:

1. Charging pressured feedwater to the first stage vacuum chamber and spraying the feed water thereto to initiate the removal of oxygen therefrom and
2. Adjusting the rate of flow of feed water to and through the scheduling means in order to maintain a predetermined volume of partially deoxygenated water at a predetermined level in said first stage vacuum chamber to thereby fluidly seal the first stage vacuum chamber from atmospheric pressure and feed water pressure;

the first stage vacuum chamber means also including liquid-liquid conduit means for feeding partially deoxygenated water to the final stage; and the doxygenator also including means for maintaining a subatmospheric pressure in the first stage which is less than the subatmospheric pressure in the deoxygenator whereby partially deoxygenated water will flow from the first stage through the liquid-liquid conduit means.

In accordance with a preferred embodiment of the present invention the first stage is also provided with means for injecting an oxygen-scavenging agent into the feed water such as means for injecting a gaseous oxygen-scavenging agent or a chemical oxygen-scavenging agent or both into the feed water.

In accordance with another embodiment of the present invention, there is provided at least one intermediate vacuum chamber deoxygenation stage comprising upstanding intermediate chamber scheduling means for spraying, into the intermediate vacuum chamger, partially deoxygenated water charged thereto from a preceeding vacuum chamber stage, and liquid-liquid conduit means operatively interconnected with a subsequent stage for feeding further deoxygenated water to such subsequent stage.

In accordance with yet another embodiment of the present invention there is provided a subatmospheric water deoxygenator comprising:

1. A lower cylindrical degassing chamber,
2. An upper cylindrical degassing chamber mounted on the lower cylindrical degassing chamber,
3. A vacuum blower mounted on the top of the upper cylindrical degassing chamber,
4. A motor mounted on top of the vacuum blower,
5. Slotted centrifugation means in the upper degassing chamber,
6. An evacuation pump in the upper degassing chamber carried by the centrifugation means for delivering deoxygenated water from the deoxygenator,
7. Drive shaft means depending from the motor in driving interconnection with the vacuum blower and in supporting driving interconnection with the centrifugation means and the evacuation pump,
8. A water chamber at the top of the lower degassing chamber,
9. A riser fluidly interconnecting the water chamber with the centrifugation means,
10. A feed water inlet line extending into the lower degassing chamber for delivering pressured feed water thereto,
11. A slotted upstanding water discharge riser fluidly connected with said water inlet line,
12. Means for injecting an oxygen-scavenging agent into the inlet line,
13. Means carried by the upstanding riser for scheduling the rate of delivery of feed water to the lower degassing chamber, for maintaining a predetermined water level in the lower degassing chamber, and for depressuring and spraying inlet water into the space above the water level in the lower degassing chamber to initiate oxygen removal,
14. Conduit means extending from below the water level of the lower degassing chamber for delivering partially deoxygenated water from said lower degassing chamber to said water chamber,
15. Float means carried by said slotted centrifugation means for maintaining the rate of flow of water from said centrifugation means equal to the rate of delivery of water to said water chamber, for spray impacting centrifuged water onto the walls of said upper degassing chamber to complete the removal of oxygen therefrom and for maintaining a predetermined level of deoxygenated water in the upper degassing chamber,
16. A vacuum line connecting the vacuum blower with the upper degassing chamber to remove gases, including oxygen, therefrom and to establish a subatmospheric pressure in the upper degassing chamber,
17. A vacuum line interconnecting the vacuum blower with the lower degassing chamber to remove gases, including oxygen therefrom and to establish subatmospheric pressure in the lower degassing chamber which is less than the subatmospheric pressure in the upper degassing chamber, and
18. A venturi adjacent the bottom of the upper degassing chamber for delivering deoxygenated water to the evacuation pump.

BRIEF DESCRIPTION OF THE DRAWING

In the accompanying drawing, the FIGURE is a schematic elevation view, partly in section, showing a preferred embodiment of the present invention.

DESCRIPTION OF THE PREFERRED EMBODIMENT

Referring now to the drawing, there is shown a deoxygenator of the present invention designated generally by the letter A which is mounted on a skid B. The deoxygenator A comprises an upper final stage degassing chamber designated generally by the letter C, a lower first stage degassing chamber designated generally by the letter D, a rotor, such as an electric powered motor or a hydraulically powered motor designated generally by the letter E, a vacuum blower such as a regenerative vacuum blower, designated generally by the letter F, a gear box designated generally by the letter G, an evacuation pump designated generally by the letter H and a water chamber designated generally by the letter J at the top of the lower degassing chamber D.

In accordance with this construction, there is provided a cylindrical pressure vessel 10 which is closed at the top with a removable lid 11. The motor E is supported on vacuum blower F which, in turn, is supported on the top lid 11 by vacuum motor support 12 and vacuum blower brackets 14. To facilitate movement of the deoxygenator A, motor handling brackets 16 may be provided on the top of the motor E to which the hook of a crane or other appropriate means (not shown) may be attached.

A drive shaft 17 extends from the motor E into driving engagement with vacuum blower impeller 18 and thence into driving engagement with the gear box 20 containing appropriate reduction gears (not shown).

A foam separation impeller 22 is rotatably secured to a gear shaft 23 depending from the gear box G, the gear shaft 23 being operatively rotatably secured to the top of a rotating slotted centrifuge tube 24. With this construction, the vacuum blower can be operated at an appropriate speed necessary for the generation of a vacuum of from about 10 to 15 inches of mercury while the foam separator impeller 22 and the slotted centrifuge tube 24 may be rotated at a different and more appropriate slower rate from the same power source.

Water evacuation pump impellers 26 and 28 are fixed to the centrifugation tube 24 for rotation therewith within the housing 29 of water evacuation pump H. Cross braces 32 mounted in the cylindrical vessel 10 support lower stops 34 and upper stops 36 for an annular float 38 that surrounds the slots of the centrifuge tube 24 and partially closes them, such that the free area of the slots will be determined by the relative position of the annular float 38.

A water discharge venturi 40 is connected to the bottom of the housing 29 for the evacuation pump H for the delivery of deoxygenated water thereto. Water is delivered to the slotted centrifuge tube 24 by a water inlet tube 42 which preferably terminates inside the housing 29 for the evacuation pump. The top of the water inlet line 42 is spaced from the bottom of the slotted centrifuge tube 24 so that the rotating centrifuge tube 24 can rotate freely without bearing upon the top of the water inlet line 42. The resultant "controlled seepage" of water from the inlet tube 42 into the evacuation pump H does not seriously adversely affect the performance of the deoxygenator and obviates the need for bearings and seals at the bottom of the slotted centrifuge tube 24.

With this construction there is also provided a water outlet 30 connected with the discharge side of the evacuation pump H and extending through the wall of the cylinder 10 for connection with a suitable conduit leading, for example, to a triplex pump for injecting water through a well into a subterranean reservoir for secondary hydrocarbon recovery operations.

A water inlet line 45 connectable to a suitable source of pressured oxygen-containing water, such as water delivered to the water inlet 45 by a discharge pipe from a water well pump, extends from the skid B upon which the deoxygenator A is mounted through the cylindrical wall 10 of lower degassing chamber D adjacent the bottom thereof into the interior of the deoxygenator.

Suitable means for the introduction of a purge gas such as nitrogen, natural gas, carbon dioxide, etc., into the inlet line may be provided such as, for example, a purge gas pump 47 having a purge gas feed line 46 fluidly connected with the inlet line 45. In like manner, there may be provided a chemical injection pump 48 leading to a chemical injection line 50 for injecting chemical oxygen-scavaging agents into the inlet line 17.

The inlet line 45 terminates in an upstanding slotted water discharge riser 46 which is closed at the top thereof with a cover plate 52 extending beyond the riser 44 to act as an upper stop for a lower annular float 54 which surrounds the slots in the riser 44 and partially closes the same such that the area exposed by the slots in the riser 44 is controlled by the rise and the fall of the annular float 54. A lower float stop plate 56 is also attached to the riser 44 to limit the level to which the lower float 54 can drop.

A lower riser 58 extends upwardly for connection with the lower of a pair of spaced plates 61—61 defining the water chamber J.

An upper chamber gas evacuation suction pipe 62 leads from the vacuum blower F to the top of the upper chamber C and a lower chamber gas evacuation suction pipe 64 leads from the vacuum blower F to the top of the lower chamber D for gas evacuation of the two chambers in order to establish a vacuum. The vacuum blower inlet of the upper chamber gas evacuation suction pipe 62 is spaced with respect to the vacuum blower inlet for the lower chamber gas evacuation suction pipe 64 such that a pressure differential will be maintained between the upper chamber C and the lower chamber D. For example, the subatmospheric pressure in the upper chamber C may be maintained at about 8 to about 15 inches of mercury while the subatmospheric pressure in the lower chamber D may be maintained at about 4 to about 8 inches of mercury, the pressure differential being adequate to induce the flow of water from the lower chamber D through lower riser 58 into water chamber J and thence into water inlet 45 leading to the slotted centrifuge tube 24 in the upper chamber C.

Also, with reference to the upper chamber C, in order to substantially eliminate the withdrawal of entrained liquids through the upper chamber gas evacuation suction pipe 62, a splatter plate 68 is mounted in the upper chamber C above the foam separator impeller 22 and spaced therefrom so as to provide an annular opening adjacent the gear box G. With this construction, gas must follow a sinuous path through the foam separation impeller 22 and along the face of the splatter plate 68 in order to reach the inlet to the upper chamber gas evacuation suction pipe 62.

In like fashion, a splatter plate 70 is provided in the lower chamber D below the inlet to the lower chamber gas evacuation suction pipe 64 in order to minimize entrainment of liquids in gases evacuated through the lower chamber gas evacuation suction pipe 64.

OPERATION OF THE PREFERRED EMBODIMENT

The preferred deoxygenator of the present invention operates to remove substantially all of the occluded oxygen in the water flowing to the deoxygenator A through water inlet line 45 and which may comprise from about 10 to about 12 parts per million of oxygen such that the deoxygenated water discharged from the deoxygenator A through water outlet 30 will contain only about 0.1 parts per million of oxygen, or less.

To facilitate in the removal of oxygen, an appropriate oxygen purge gas such as nitrogen, natural gas, flue gas, carbon dioxide, etc., may be charged from pump 47 through purge gas feed line 46 to the water flowing into the deoxygenator A through water inlet line 45. In like manner, a chemical oxygen-scavanging agent may be injected into the water inlet line 45 through a line 50 by way of chemical injection pump 48.

The thus-treated pressured water will flow through water inlet line 45 and upstanding slotted riser 44 where the pressure on the inlet water will be broken as the inlet water is sprayed into the lower chamber D through the openings defined by the slots in the riser 44 and the annular float 54. It will be apparent water will accumulate at the bottom of the lower chamber D and that the water level will be determined by the relative rate of charge of inlet water through the lines 52 to the lower chamber D and the rate of discharge of water therefrom through the riser 58. If water flows through the inlet line 45 faster than it is withdrawn through the riser 58, the water level will tend to rise, but the float 54 will also rise thus limiting the open area defined by the slots in the riser 44 and the float 54 to restrict the flow of water into the lower chamber D until an appropriate equilibrium is established. In like fashion, if the rate of withdrawal of water through the riser 58 is greater than the rate of supply of water through the inlet line 45, the water level will tend to fall exposing a greater area for water discharge thereby permitting a greater rate of flow of water into the lower chamber D.

As explained above, rotation of an appropriate vacuum blower such as a regenerative vacuum blower F by the drive shaft 17 for the motor E will generate a vacuum in upper chamber C and lower chamber D such that there is a pressure differential between upper chamber C and lower chamber D so that upper chamber C is at a lower pressure such as a pressure of about 8 to about 15 inches of mercury while the pressure in the lower chamber D is at a pressure of about 4 to 8 inches of mercury. As a consequence, water sprayed into the lower chamber D through the openings in the riser 44 will be urged upwardly through riser 58 into the water chamber J and thence through water inlet line 42 into upper chamber C.

Water sprayed from the openings in the riser 44 into the space above the water in the lower chamber D will tend to impact upon the inner sides of the cylinder 10 thereby initiating deoxygenation of the water fed through the inlet line 45. Also, this will result in a thorough intermixing of the gaseous oxygen-scavenging agent and/or chemical scavenging agent injected into the water inlet 45 by way of lines 46 and 50, respectively. Rotation of the centrifuge tube 24 will impart upward accelerating rotary motion to partially deoxygenated water delivered thereto through the line 42 and the resultant spraying of the thus centrifuged water through the slots in the centrifuge tube 24 will result in a sheet of water being sprayed onto and impacting on the inner walls of the cylinder 10 to thus substantially complete the removal of oxygen from the feed water. The thus deoxygenated water will flow downwardly past cross braces 32 and into venturi 40 leading through the housing 29 of the evacuation pump where the impellers 26 and 28 will repressure the now deoxygenated water for discharge from the deoxygenator A through an outlet line 30 which may connect to a suitable device such as a triplex pump for pumping the deoxygenated water under pressure through an injection well and into a subterranean formation as part of a secondary recovery operation. An advantage of the present invention is that the deoxygenator A acts as a supercharger for a well water injection pump such as a triplex pump so that there is no need for the provision of a water tower as has heretofore been the practice.

In order to prevent the entrainment of liquid water droplets in the gases withdrawn through the upper and lower chamber gas evacuation suction pipes 62 and 64, a splatter plate is provided in the lower chamber at 70 and a combination of a foam separation impeller 22 with a splatter disk 68 is provided adjacent the top of the upper chamber C so that gas liberated in the upper chamber C must follow a sinuous path arriving at the upper chamber gas evacuation suction pipe 62.

The first stage vacuum chamber water deoxygenation means of the present invention includes lower chamber D, and the riser 58, the water chamber J and the riser 42 (which also constitute a liquid-liquid conduit means), as well as upstanding riser 44 and associated cover plate 52, stop plate 56 and float 54.

The final stage vacuum chamber water deoxygenation means of the present invention includes the upper chamber C, means for accelerating and centrifuging the partially deoxygenated water (centrifuge tube 24 driven by shaft 23 depending from the gear box G) and the pump means for discharging deoxygenated water (pump impellers 26 and 28, housing 29, outlet 30 and venturi 40) and final stage scheduling means.

It will be seen that with this construction, the slotted riser 44, the lower float 54, the cover plate 50 and the lower stop 56 constitute a first stage scheduling means connected to a pressured feed water source for simultaneously and continuously charging pressured feed water to the lower chamber D, for spraying the feed water into the lower chamber D to initiate the removal of oxygen, for adjusting the rate of flow of feed water into the lower chamber D in order to maintain a predetermined volume of partially deoxygenated water at a predetermined level in the lower chamber D and to fluidly seal the lower chamber D from atmospheric pressure and feed water pressure.

It will also be seen that the vacuum blower F and the upper and lower chamber gas evacuation suction pipes 62 and 64 constitute a vacuum means for maintaining a subatmospheric pressure in the lower chamber D which is less than the subatmospheric pressure in the upper chamber C such that partially deoxygenated water will flow through the riser 58 into the water chamber J defined by the plate 61—61 and thence through the water inlet line 42 to the slotted centrifuge tube 24.

It will also be seen that float 38, stops 34 and 36, and slotted centrifuge tube 24 provide a final stage scheduling means in upper chamber C for simultaneously and continuously adjusting the rate of flow of partially deoxygenated water thereto and also constitute a centrifugal vacuum chamber means for continuously accelerating and centrifuging the par-tially deoxygenated water under vacuum and for spray impacting the accelerated and centrifuged water as a thin film onto the surface of the cylinder 10 to thereby substantially complete the removal of gaseous oxygen from the water.

It will be further apparent that an intermediate stage vacuum chamber water deoxygenating means including an intermediate stage scheduling means would comprise an additional lower chamber D and an additional water chamber J sandwiched between the water chamber J defined by the plates 61—61 and the upper chamber C and would also include an additional water inlet line 42, an additional upstanding slotted riser 44 (connected in this case however with additional water inlet line 42), an additional cover plate 52 and an additional lower float stop plate 56, an additional lower annual float 54, an additional lower riser 58, an additional splatter plate 70 and an additonal suction pipe 64 interconnected with the vacuum blower F so as to provide a subatmospheric pressure intermediate the subatmospheric pressure in the upper chamber C and the lower chamber D. It will be still further apparent that by replicating the structure for a just-described intermediate stage vacuum chamber water deoxygenating means it is possible to provide as many additional intermediate stages as desired It will be apparent to those skilled in the art that numerous modifications of the present invention are possible without departing from the spirit thereof and that, therefore, the scope of the invention is defined by the claims appended hereto.

I claim:

1. A plural stage subatmospheric water deoxygenator for continuously scavenging oxygen from oxygen-contaminated feed water which comprises first stage vacuum chamber water deoxygenating means containing a body of initially deoxygenated water, at least one intermediate stage vacuum chamber water deoxygenating means containing a body of further deoxygenated water, final stage vacuum chamber water deoxygenating means containing a body of substantially deoxygenated water, liquid-liquid conduit means sequentially interconnecting said stages for conveying water from a stage to the next succeeding stage, and vacuum means interconnected with said stages for maintaining a progressive subatmospheric pressure differential therebetween, said first stage being under the least subatmospheric pressure and said final stage being under the greatest subatmospheric pressure;

said first stage vacuum chamber means including first stage scheduling means fluidly connectable with a pressured feed water source for simultaneously, continuously:

adjusting the rate of flow of feed water thereto in order to maintain a predetermined volume of said partially deoxygenated water in said first stage vacuum chamber, fluidly sealing the interior of said first stage vacuum chamber from atmospheric pressure and feed water pressure; and spraying a stream of feedwater into said first stage vacuum chamber to reduce the pressure thereon to the subatmospheric pressure of said first stage to partially deoxygenate said feed water;

each of said intermediate stage vacuum chamber means including upstanding intermediate chamber scheduling means for spraying said body of further deoxygenated water thereinto and for maintaining a body of water therein;

said final stage vacuum chamber means including means for continuously accelerating and centrifuging said further deoxygenated water under vacuum and for spraying said thus-accelerated and centrifuged water into said final stage vacuum chamber to thereby substantially completely remove the remainder of said gaseous oxygen therefrom and also including pump means for delivering deoxygenated water under pressure from said deoxygenator.

2. A deoxygenator scavenger as in claim 1 including treater means for injecting an oxygen-scavenging agent into said feed water.

3. A deoxygenator as in claim 2 including means connected with said pressured feed water source for injecting a gaseous oxygen-scavenging agent into said feed water.

4. A deoxygenator as in claim 2 including means connected with said pressured feed water source for injecting a chemical oxygen-scavenging agent into said feed water.

5. A deoxygenator as in claim 2 including means connected with said pressured feed water source for injecting both a chemical oxygen-scavenging agent and a gaseous oxygen-scavenging agent into said feed water.

6. A dual stage centrifugal vacuum deoxygenator for continuously scavenging oxygen from a source of pressured oxygen-contaminated feed water which comprises:

lower first stage vacuum chamber means including first stage scheduling means fluidly connected with said feed water inlet for simultaneously, continuously:

adjusting the rate of flow of feed water through said scheduling means in order to maintain a predetermined volume of water in the lower part of said first chamber, intimately mixing gaseous and chemical oxygen scavenging agents with said feed water;

fluidly sealing said first stage vacuum chamber from atmospheric pressure and said pressured feed water inlet; and jetting a stream of treated feed water laterally through the vapor space in the upper part of said first chamber to partially deoxygenate said feed water;

second stage centrifugal vacuum chamber means mounted on and above said first stage vacuum chamber means for continuously accelerating and centrifuging said partially deoxygenated water under vacuum and for spray impacting said thus-accelerated and centrifuged water as a thin film onto an impact surface to thereby substantially completely remove the remainder of said gaseous oxygen therefrom to provide a body of deoxygenated water;

pump means carried by said second stage vacuum chamber means and fluidly connected with said body of deoxygenated water for delivering deoxygenated water under pressure from said deoxygenator; and vacuum gas removal means connected with said first stage vacuum means and said second stage vacuum means for removing gases, including gaseous oxygen, from said deoxygenator and for maintaining a subatmospheric pressure in said first stage less than the subatmospheric pressure in said second stage, said first stage scheduling means comprising an upstanding inlet riser closed at the top thereof and slotted adjacent the top thereof, annular float means encasing the slotted portion of said riser for at least partially closing the slots in said riser, and stop means for limiting vertical movement of said annular float means relative to said slots.

7. A dual stage deoxygenator as in claim 6 wherein said second stage centrifugal vacuum chamber means includes centrifugation means comprising an upper slotted tubular end section, annular float means encasing said upper slotted tubular end portion for at least partially closing the slots therein, and stop means for limiting vertical movement of said annular float means relative to said slots.

8. In a subatmospheric water deoxygenator wherein oxygen-containing water is charged thereto through a water feed line and sprayed into a vacuum chamber for the removal of oxygen and for the delivery of deoxygenated water from the deoxygenator, the improvement which comprises:

first stage vacuum chamber means carried by said deoxygenator comprising:

first stage vacuum chamber scheduling means connectable to a pressured feed water source for simultaneously and continuously:

charging pressured feed water to said first stage vacuum chamber and spraying the feed water thereinto to initiate the removal of oxygen therefrom, adjusting the rate of flow of feed water to and through said scheduling means in order to maintain a predetermined volume of partially deoxygenated water at a predetermined level in said first stage vacuum chamber to thereby fluidly seal said first stage chamber from atmospheric pressure and feed water pressure;

liquid-liquid conduit means interconnecting the partially de-oxygenated water in said first stage with said deoxygenator water feed line; and vacuum means for maintaining a subatmospheric pressure in said first stage which is less than the subatmospheric pressure in said deoxygenator whereby partially de-oxygenated water will flow from said first stage to said deoxygenator water feed line through said liquid-liquid conduit means;

said first stage vacuum chamber means including injection means connected with said pressured feed water source for injecting both a chemical oxygen-scavenging agent and a gaseous oxygen-scavenging agent into said feed water;

said first stage scheduling means also comprising an upstanding inlet riser closed at the top thereof and slotted adjacent the top thereof, annular float means encasing the slotted portion of said riser for at least partially closing the slots in said riser, and stop means for limiting vertical movement of said annular float means relative to said slots, whereby movement of said float means relative to said slots will simultaneously and continuously:

adjust the rate of flow of feed water through said scheduling means in order to maintain a predetermined volume of water in the lower part of said lower chamber, intimately mix gaseous and chemical oxygen scavenging agents with said feed water;

fluidly seal said first stage vacuum chamber from atmospheric pressure and said pressured feed water inlet; and jet a stream of treated feedwater laterally through the vapor space in the upper part of said lower chamber to partially deoxygenate said feed water;

said second stage cylindrical vacuum chamber means also including a cylindrical rotatable centrifugation tube slotted adjacent the top thereof, an upper stage riser for delivering partially deoxygenated water to said centrifugation tube, an evacuation pump annularly mounted to and rotatable with said centrifugation tube, and scheduling means comprising annular float means encasing said slots in said centrifuge tube for partially closing said slots and stop means for limiting movement of said annular float means relative to said slots for regulating the rate of spraying of said partially deoxygenated water through said slots in said centrifuge tube.

9. A subatmospheric water deoxygenator comprising:
a lower cylindrical degassing chamber,
an upper cylindrical degassing chamber mounted on said lower cylindrical degassing chamber,
a vacuum blower mounted on the top of said upper cylindrical degassing chamber,
a motor mounted on said vacuum blower,
slotted centrifugation means in said upper degassing chamber,
an evacuation pump in said upper degassing chamber carried by said centrifugation means for delivering deoxygenated water from said deoxygenator,
drive shaft means depending from said motor in driving interconnection with said vacuum blower and in supporting driving interconnection with said centrifugation means and said evacuation pump
a water chamber at the top of said lower degassing chamber,
a riser fluidly interconnecting said water chamber with said centrifugation means,
a feed water inlet line extending into said lower degassing chamber for delivering pressured feed water thereto,
a slotted upstanding water discharge riser fluidly connected with said water inlet line,
means for injecting an oxygen scavenging agent into said inlet line,
means carried by said upstanding riser for scheduling the rate of delivery of feed water to said lower degassing chamber, for maintaining a predetermined water level in said lower degassing chamber, for depressuring and spraying inlet water into the space above said water level to initiate oxygen removal,
conduit means extending from below said water level to said water chamber for delivering partially deoxygenated water from said lower degassing chamber to said water chamber,
float means carried by said slotted centrifugation means for maintaining the rate of flow of water from said centrifugation means equal to the rate of delivery of water to said water chamber, for spray impacting centrifuged water on the walls of said upper degassing chamber to complete the removal of oxygen therefrom and for maintaining a predetermined level of deoxygenated water in said upper degassing chamber,
a vacuum line interconnecting said vacuum blower with said upper degassing chamber to remove gases, including oxygen, therefrom and to establish a maximized subatmospheric pressure in said upper degassing chamber,
a vacuum line interconnecting said vacuum blower with said lower degassing chamber to remove gases, including oxygen therefrom and to establish a subatmospheric pressure in said lower degassing chamber less than the subatmospheric pressure in said upper degassing chamber, and
a venturi adjacent the bottom of said upper degassing chamber for delivering deoxygenated water to said evacuation pump.

* * * * *